United States Patent Office 2,762,128
Patented Sept. 11, 1956

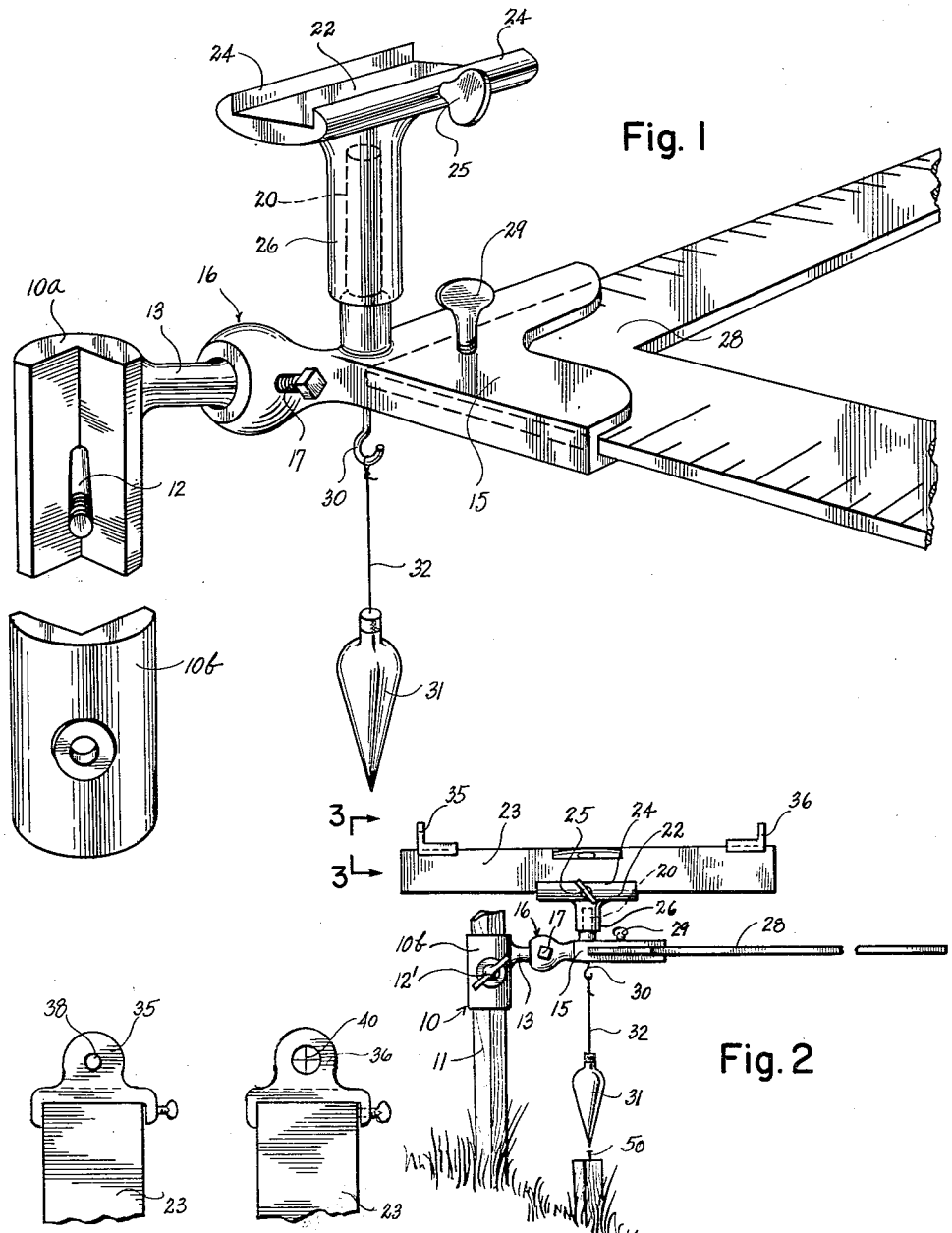

2,762,128

LEVELING DEVICE

George Milton Whelan, Bothell, Wash.

Application July 17, 1953, Serial No. 368,684

2 Claims. (Cl. 33—73)

This invention relates to a leveling and line sighting device, and it has reference more particularly to a device of that character comprising a combination of parts including a carpenters spirit level, a carpenters square and relatively adjustable holders therefor; such a device being especially adjustable holders therefor; such a device especially useful to carpenters, excavators, contractors, and the like, for use in such work as laying out points from which to work, as for example, for the locating of corners, lines and levels preparatory to the building of a foundation, house or other structure.

It is the primary object of the present invention to provide a level running and squaring device of the above stated character that is relatively inexpensive; that is easy to use, and is entirely satisfactory for its intended uses.

Another object of the invention is to provide adjustably associated holding devices with which a carpenters spirit level and carpenters square can be applied for use in combination to obtain results comparable to those ordinarily obtained by use of a surveyors transit.

Still further objects of my invention reside in the details of construction of its various parts, in their combination and mode of use, as will hereinafter be fully described.

In accomplishing these and other objects of the invention, I have provided the improved details of construction, the preferred forms of which are illustrated in the accompanying drawings, wherein:

Fig. 1 is a perspective view of parts embodied by the present invention.

Fig. 2 is a perspective view of the present combination of parts as applied to a supporting stake.

Figs. 3 and 4, respectively, are end views of the sighting devices as applied to the opposite ends of the spirit level.

Referring more in detail to the drawings:

In its present preferred form of construction, the device of this invention includes a fixing and supporting clamp 10 that is designed to be applied and secured to a support. As seen in Fig. 1, this clamp comprises the two complemental parts, 10a and 10b, which are adapted to be applied, as in Fig. 2, to opposite sides of a supporting member, such as stake 11, or to a pipe or a pin driven into the ground, and to be tightened thereagainst by a suitable clamping collar or, as here shown, by means of a bolt 12 passed through the parts and drawn tight by a wing nut 12' applied to the bolt.

Extended laterally from the clamp member 10a is an arm 13, to the outer end of which arm a square and level mounting member 15 is adjustably secured by ball and socket joint forming members designated generally by numeral 16. A set screw 17 threaded through the socket member is adapted to be tightened against the contained ball member to retain any leveling adjustment of the member 15 relative to the supporting clamp member 10.

Formed on the member 15 is an upwarddly directed post 20 on which a holder for a carpenters level is mounted for rotary adjustment. The holder comprises a horizontal base portion 22 upon which the level 23 is disposed, and this is formed along opposite side edges with flanges 24—24 between which the level may be held. A set screw 25, applied through one of the flanges 24 is adapted to be tightened against a side of the level to hold it secure and against accidental displacement.

Extended downwardly from the central portion of the base member 22 is a hub 26 that is longitudinally bored to contain the post 20 rotatably therein. The top surface of part 22 lies in a plane that is perpendicular to the post 20.

Formed in the member 15 is a horizontal slot within which the corner portion of an ordinary carpenters square, such as that designated at 28 can be received and locked secure and held rigid by a set screw 29 that is threaded through the top wall of the member. This slot is formed in a plane that is perpendicular to the post 20. Therefore, when the member 15 is adjusted to a position that places the post in a vertical position, a square 28 as applied to the member 15, as in Fig. 2, will be held in a horizontal plane.

Applied to the member 15 at its under side and in axial alignment with the post 20, is a hook 30 to which a plumb bob 31 is held in suspension by means of a cord 32.

To prepare the present device for use, the clamp 10 is first secured to a support, such as the stake 11, and the member 15 then adjusted to a level position and secured. To level up the member 15, the set screw 17 is first slightly loosened. The level is then set in place on the base 22 and is secured. Then, by rotatably adjusting the base on the post 20, the level is caused to be directed along one arm of the carpenters square and is then brought to a level position by raising or lowering the outer end of that arm of the square and temporarily holding it by any suitable means in a leveled position, for example, by use of a stake. Then the level mounting base is rotatably adjusted on post 20 to cause the level to be directed along the other arm of the square, and is again brought to a level position by raising or lowering that arm. These operations can be repeated until the level 22 can be swung to any position and will remain level. Then the part 15 is secured by tightening the set screw 17.

To further aid in the use of the device, the level is equipped at opposite ends with sighting blocks 35 and 36 that are secured to its top surface at opposite ends. Block 35 is formed with a peep sight 38 and block 36 has a hole across which cross-hairs as at 40 are drawn.

Assuming the device to be so constructed and mounted in such position that the plumb bob is set over a starting point as designated at 50 in Fig. 2, and the square brought to a level position in the manner above described it will be understood that lines may be run at right angles to each other by aligning the level with one arm of the square, and setting a marker in alignment with a line of sight then taken through the sighting devices. Then, turning the level to a position aligned with the other arm of the square and repeating the sighting operation. The level 22 can be brought into exact alignment with an arm of the square by the user sighting from a point a few feet above the square along a longitudinal edge thereof and rotatably adjusting the level, as held on its support 22, about the pivot post 20 until that edge of the square sighted on appears to coincide with a longitudinal edge of the arm of the square. Since the edges cited on are in parallel horizontal planes, the bringing of them, by this sighting operation into apparent coincidence, results in the aligning of the level with the arm of the square. Also, a level can be established along either line of sight or at any position of rotary adjustment of the level.

Such devices are inexpensive, easy to use, accurate and practical.

Having thus described my invention, what I claim as new therein and desire to secure by Letters Patent is:

1. In combination, a clamp comprising complemental clamp members adapted for rigid securement to a support and a rigid arm extended from said clamp, a holder adjustably fixed to said arm and having a socket therein designed to seat the corner portion of a carpenters square therein for the fixed support of the square in a horizontal plane, a post extended upwardly from said holder with its axis aligned with the corner of the square as seated in said socket, a base member mounted for rotation on said post, means for the fixed mounting of a spirit level on said base member in a plane that is parallel to the plane of a square as secured in the holder.

2. In combination, a clamp comprising complemental clamp members adapted for rigid securement to a support and a rigid arm extended from said clamp, a holder adjustably fixed to said arm and having a socket therein designed to seat the corner portion of a carpenter's square therein for the fixed support of the square in a horizontal plane, a post extended upwardly from said holder with its axis aligned with the corner of the square as seated in said socket, a base member mounted for rotation on said post, a spirit level fixedly mounted on said base in a plane that is parallel to the plane of the secured square, and sighting blocks mounted on the opposite ends of said spirit level; said base being rotatable to selectively align the level with the blades of the square for leveling the square and for bringing sighted lines into right angular relationship.

References Cited in the file of this patent

UNITED STATES PATENTS

| 60,788 | Richardson | Jan. 1, 1867 |
| 1,054,304 | Merkel | Feb. 25, 1913 |
| 1,209,922 | Woodell | Dec. 26, 1916 |

FOREIGN PATENTS

| 36,320 | Switzerland | Mar. 17, 1906 |
| 118,432 | Sweden | Mar. 26, 1947 |